Aug. 28, 1928.
J. F. PALMER
1,682,238
PROCESS FOR FORMING PNEUMATIC TIRES
Filed May 23, 1924   2 Sheets-Sheet 1
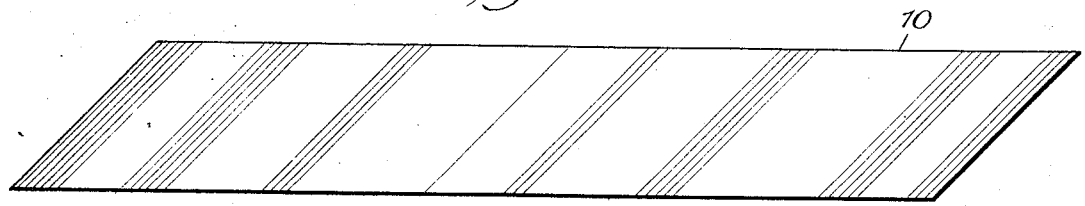
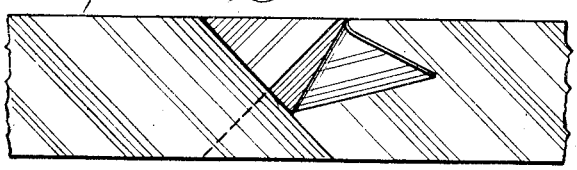
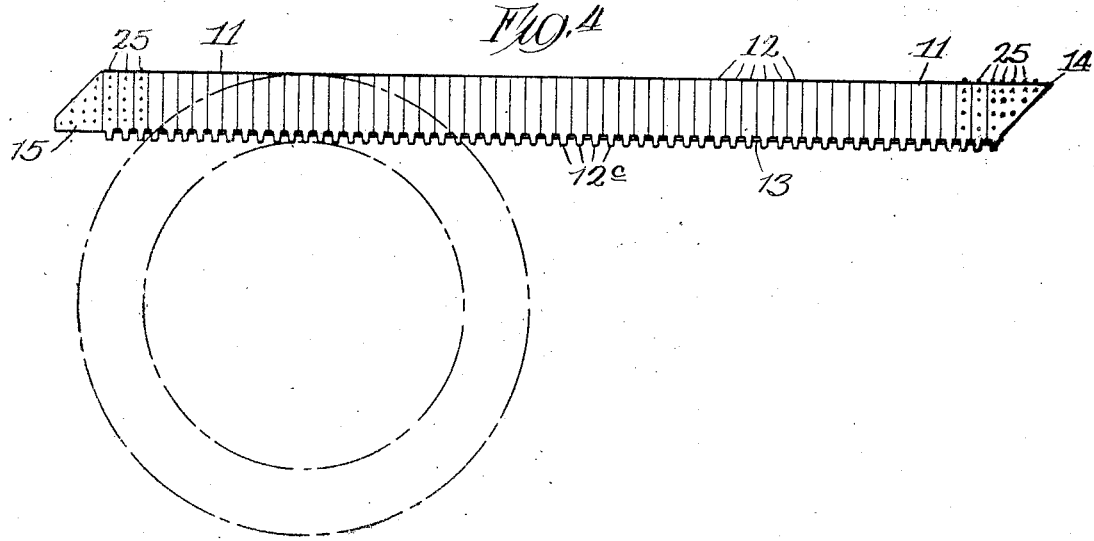
Inventor:
John F. Palmer
by Wallace R. Lane Aug. 28, 1928.  
J. F. PALMER  
1,682,238  
PROCESS FOR FORMING PNEUMATIC TIRES  
Filed May 23, 1924  
2 Sheets-Sheet 2
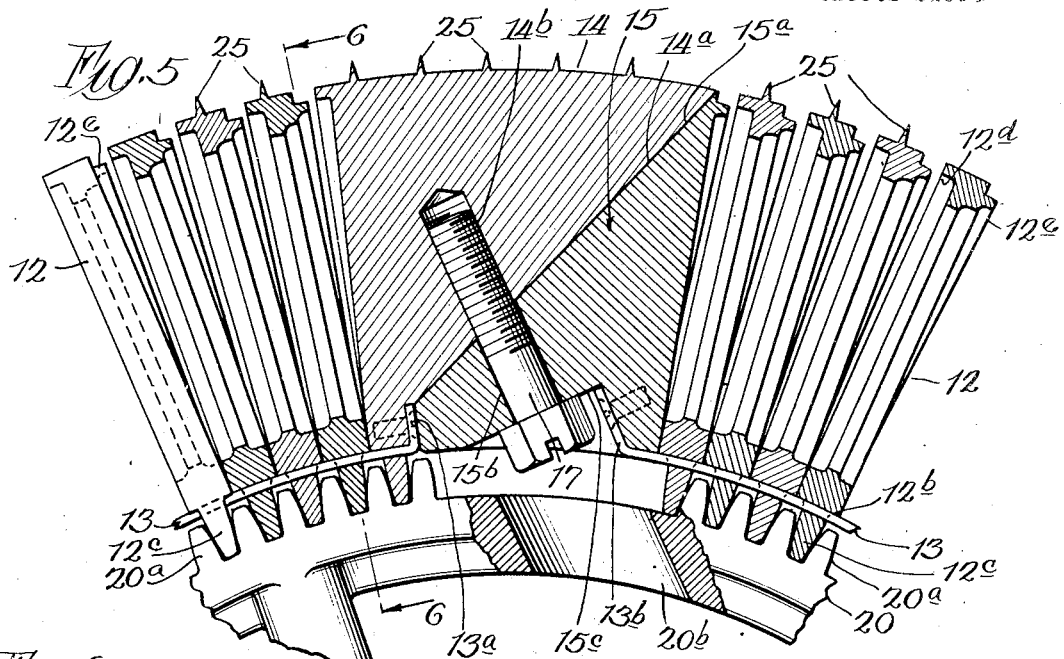
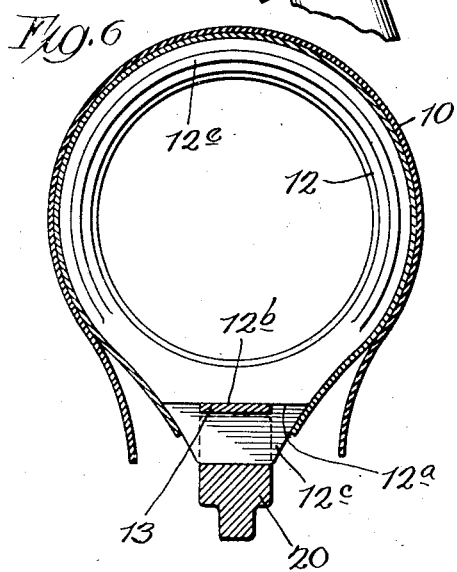
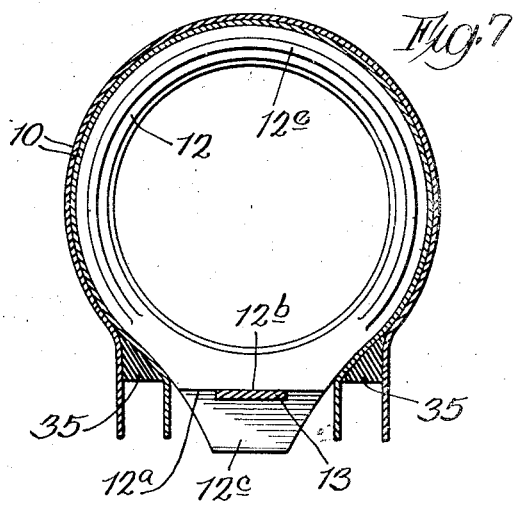
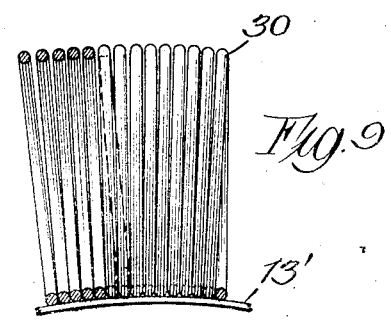
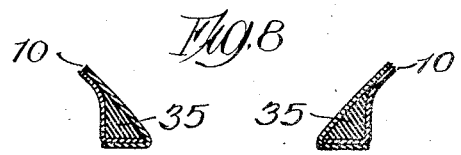
Inventor:  
John F. Palmer  
by Wallace R. Lane.  
Attys Patented Aug. 28, 1928.

1,682,238

UNITED STATES PATENT OFFICE.

JOHN F. PALMER, OF BUFFALO, NEW YORK.

PROCESS FOR FORMING PNEUMATIC TIRES.

Application filed May 23, 1924. Serial No. 715,362.

This invention relates to improvements in the process of and apparatus for forming pneumatic tire casings, and has for its object the provision of means by which the cord or cord fabric ordinarily used in the building up of pneumatic tire carcasses will be subjected to a stretching action which will cause the individual cords to accommodate themselves to the annular form of the casing or carcass without necessity for "stitching" or like operations, now required to dispose of the excess of fabric in the side walls of the carcass.

Another object consists in the provision of improved apparatus for so treating the cord fabric.

These and other objects will be more fully described and set forth in the following specification and shown in the accompanying drawings, in which—

Fig. 1 is a plan view of a bias cut ply of cord fabric.

Fig. 2 shows a pair of reversely arranged plies, the one superimposed upon the other.

Fig. 3 shows the method of joining the free ends of the plies.

Fig. 4 is a side elevation of a mandrel constructed for the carrying out of my process.

Fig. 5 is a vertical section through a portion of the mandrel after the same has been bent to annular form on a wheel or drum and locked.

Fig 6 is a transverse section through the mandrel showing a pair of plies arranged thereon.

Fig. 7 is a view similar to Fig. 6 showing the beads inserted in place.

Fig. 8 is a vertical section through the bead portions of the carcass after insertion of the bead members and arrangement of the free edges of the plies.

Fig. 9 is a detail of a modified form of mandrel, portions thereof being broken away for clearness.

Like numerals refer to like elements throughout the drawings, in which 10 designates generally a ply of fabric formed of parallel cords in well known manner, these plies being cut from a sheet of cord fabric in such wise as to form what is termed a bias-cut ply of rhomboidal form, the individual cords of the ply being parallel to the ends of the ply, and arranged to lie transversely of the completed carcass in planes angularly disposed to the general plane of the same.

I provide a mandrel 11, shown in the preferred embodiment illustrated, formed of a plurality of hollow or annular elements 12 of contour approximating the cross section of a tire carcass or casing to be formed thereon. These elements are provided with the flattened bottom shoulders 12$^a$, through each of which extends a slot 12$^b$. Downwardly from the shoulder 12$^a$ projects a tooth portion 12$^c$ of reduced thickness and width as shown in Figs. 5 to 7, for example. Through the slots 12$^b$ extends a flexible steel spring 13, the elements 12 being mounted thereon in proper mutual relation to permit bending of the mandrel to circular form, this forming an articulated construction. Each of the elements 12 is provided with a peripheral recess 12$^d$ on one side and a tapered peripheral flange 12$^e$ on the opposite side, constructed to fit into the recess 12$^d$ of the adjacent element when the mandrel is in straight line condition. The flange 12$^e$ merges with the side wall of the element 12 at its points of origin near the base of the element and increases in height to a maximum at the outer periphery as shown in Figs. 5 and 7. At one end of the mandrel 11 is provided the end piece 14 beveled at its under side at 14$^a$, and having an outer surface conforming to that of the elements 12. Similarly at the other end of the mandrel is provided a second end piece 15 oppositely beveled at 15$^a$ to underlie and contact with the beveled surface 14$^a$ of end piece 14 when the mandrel has been bent to circular form as shown in Fig. 5. On its outer surface this end piece 15 likewise conforms to the contour of the elements. A threaded bolt-hole 14$^b$ is provided in the end piece 14, and is alignable with an aperture 15$^b$ slightly larger in the end piece 15, the bottom of this piece being slightly notched or recessed at 15$^c$ to accommodate the entrance or withdrawal of the fastening bolt 17, see Fig. 5. This permits the temporary attachment of the two end pieces to maintain the mandrel in circular condition. One end of the spring 13 is anchored by set screw or the like at 13$^a$ to end piece 14, and the other end is similarly anchored or secured at 13$^b$ to end piece 15.

To insure true bending of the mandrel to circular form, I contemplate the use of a toothed gear or drum 20, the teeth 20ᵃ of which are properly constructed and spaced to accommodate projecting teeth 12ᶜ of the elements 12 without unnecessary clearance. The outer rim of the wheel 20 is apertured at 20ᵇ to permit the insertion of the bolt 17 and a screwdriver or other tool to engage or disengage the same.

On the outer surface of the end pieces 14 and 15, as well as the elements adjacent thereto, are provided pins or spurs 25 sufficient in number to engage and secure the free ends of the carcass plies prior to bending of the mandrel.

In Fig. 9, I have illustrated a modification of my apparatus, in which I have utilized a coiled spring 30, the bottom of each convolution thereof being suitably secured by spot welding or otherwise to steel spring 13'. This provides a mandrel capable of use in carrying out of my process. It will also be obvious that other tubular bendable mandrels may be utilized in the carrying out of the process.

In the practice of my process, with the apparatus shown in Figs. 4 to 7, for example, I place upon the mandrel 11 in straight line condition, as shown in Fig. 4, plies of bias cut fabric 10 cut to proper width, with the component cords thereof arranged in proper angular relation to the longitudinal axis. As is well known in present day practice, this cord fabric is impregnated or coated with frictioning rubber in a gummy condition. In the practice of my process, where for example a two ply tire carcass is to be constructed, I superimpose one ply upon the other as indicated in Fig. 2, with the cords of one reversed with respect to the other, and smooth the plies down upon and partially around the mandrel in the form shown in Fig. 4, with the sides of the lowermost ply pressed into contact with the sides of the mandrel, the lower side portions of the upper ply being allowed to lie out of contact, as shown in Fig. 6. The ends of the plies are pressed into engagement with the spurs or pins 25. After this if so desired the remaining components of the tire casing may be built up upon the mandrel, i. e., the usual tread and side wall members of rubber or the like. After this fabrication upon the mandrel in straight line condition, the same is bent around the toothed circumference of a drum or wheel 20 until the beveled ends of pieces 14 and 15 are brought into contact, after which the locking bolt 17 is employed to lock the ends of the mandrel in circular form. The projecting overlapping ends of the plies may be then joined and a proper jointure made of the other component members.

The construction of the mandrel is such that equal movement of the elements takes place, the movement being graduated in amount from the line of the spring 13 to the outer periphery of the mandrel, the spring forming the line of hinged movement. It is desirable to locate the bead line of the carcass between this hinge line and the plane of mid-points of the elements 12. In the embodiment shown, I have located the bead line slightly above the hinge line.

The curving of the mandrel results in the bringing of the carcass to the desired shape, and during the movement the cord members in the plies are properly disposed and adjusted to accommodate the varying amounts of movement at the various points in the carcass. This eliminates the necessity for disposition of an excess of fabric at the sides which must be accomplished in present day practice operations by "stitching" or other operations, the result of which, in addition to consuming time, is not as satisfactory.

After the bending of the mandrel and locking of the same in position shown in Fig. 5, the pre-formed bead members 35 may be accurately placed between the proper plies in the space provided, this process permitting the use of jigs or other means to accurately place the beads, after which the free sides of the fabric may be enveloped by the bead members, as shown in Fig. 8. It may be desirable in some instances to defer the addition of the side wall and tread members until this point, i. e., after the bending of the mandrel with the enveloping fabric plies to circular position. The mandrel and carcass may now be moved transversely off the wheel 20, after which the ends of the mandrel are unlocked and the same withdrawn from the carcass. It is now possible to insert the air bags, moulds or the like, and subject the carcass to the usual curing or vulcanizing operations, and to affix the rubber side walls and tread in the well known manner.

It will be obvious that in the construction of clincher type tires, for example, where unexpansible beads are desired, it is possible to insert the usual bead members between the plies of the carcass and apply the usual side and tread members before bending of the mandred, if so desired, after which the ends may be united or locked and all tire members joined when the mandrel has been bent to circular form.

When it is desired to utilize a greater number of plies in the formation of a carcass, this may be readily done by alternating the cord arrangement, as shown in Fig. 2, or two or more of the adjacent plies may be arranged with the cords running in the same direction, and the over- and under-lying plies with the cords arranged in reverse relation.

The operation is substantially the same with the use of a mandrel in the form shown in Fig. 9, save a smooth drum or wheel may be utilized in lieu of that shown and described above.

It will be obvious that my invention is susceptible of numerous modifications, and I do not wish to be restricted to the form shown and described, save as defined in the appended claims.

What I claim is:

1. A process of forming pneumatic tire carcasses comprising building up a plurality of plies of carcass material on a straight mandrel, and thereafter bending said mandrel to properly modify said plies to conform to annular carcass shape.

2. A process of forming pneumatic tire carcasses consisting of enveloping a straight mandrel with plies of carcass material, thereafter bending the mandrel to substantially annular form, inserting bead members, and thereafter removing said mandrel from the carcass.

3. A process of forming pneumatic tire carcasses consisting in superposing plies of bias-cut fabric on a straight mandrel, bending said mandrel to substantially annular form, and uniting the free ends of said plies.

4. A process of forming pneumatic tire carcasses, consisting in superposing plies of bias-cut fabric on a straight mandrel, contacting the free edges of one of said plies with said mandrel, bending said mandrel to substantially annular form, inserting bead members between said contacted free edges and the corresponding edges of the superposed ply, and thereafter removing said mandrel from the carcass thus formed.

5. A process of forming pneumatic tire carcasses consisting in superposing plies of bias-cut fabric on a straight mandrel, alternate of said plies arranged with the component members thereof in reverse relation to the intermediate plies, bending said mandrel to substantially annular form, applying bead members between a pair of said plies, and thereafter removing said mandrel.

6. A process of forming pneumatic tire casings, consisting in fabricating a tire casing upon a straight form, thereafter bending the form to circular condition to properly dispose of the elements of said casing.

7. A process of forming pneumatic tire casings, consisting of partially enveloping a straight form with bias cut fabric plies, thereafter superimposing the side wall and tread members, then bending said form to circular condition, uniting the free ends of said fabricated casing, removing the same from said mandrel and subjecting it to vulcanizing process.

In witness whereof, hereunto subscribe my name to this specification.

JOHN F. PALMER.